T. A. WILLARD.
STORAGE BATTERY.
APPLICATION FILED OCT. 8, 1917.
1,263,500. Patented Apr. 23, 1918.
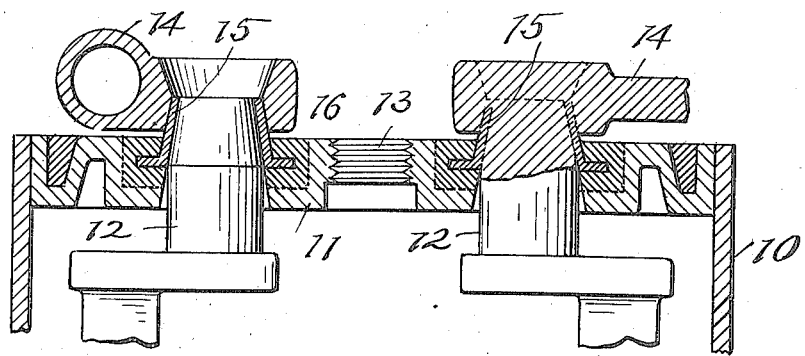
Fig. 1.
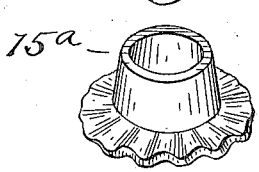
Fig. 2.
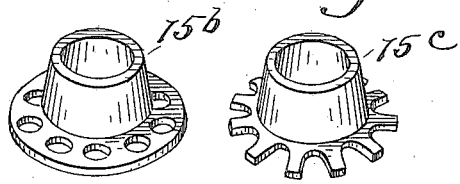
Fig. 4.
Fig. 3.
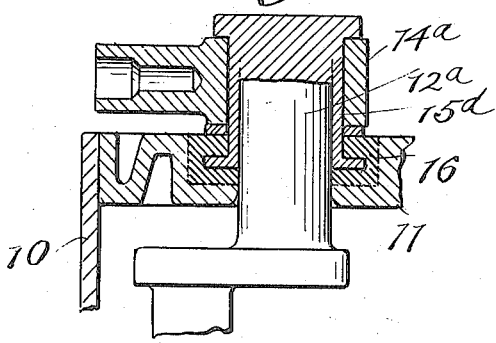
Fig. 5.
Inventor
Theodore A. Willard
By Thurston & Kwis
Attys

UNITED STATES PATENT OFFICE.

THEODORE A. WILLARD, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,263,500.　　　　Specification of Letters Patent.　　Patented Apr. 23, 1918.

Application filed October 8, 1917. Serial No. 195,209.

*To all whom it may concern:*

Be it known that I, THEODORE A. WILLARD, a citizen of the United States, residing at East Cleveland, in the county of Cuyahoga and State of Ohio, have invented a certain new and useful Improvement in Storage Batteries, of which the following is a full, clear, and exact description.

This invention relates to storage batteries and covers certain modifications in the storage battery construction shown in my prior application, Serial No. 71,142, filed January 10, 1916.

In my prior application I disclose and claim a novel sealing means for sealing the cover against leakage of electrolyte around the posts. The sealing means consists of sleeves, which as shown in said application, are at their lower ends embedded or molded in the cover around the posts and extend upwardly along the latter, and at their upper ends are interposed between the posts and connectors and are lead-burned to both the latter.

In the present invention, similar sealing sleeves are employed, one of the features of the present invention being a novel manner of connecting the lower ends of the sleeves to the cover. The invention relates also to a novel sealing form or arrangement pertaining especially to the posts to which the end or terminal connectors are attached.

In the accompanying sheet of drawings, Figure 1 is a transverse sectional view through the top portion of a battery showing my invention; Figs. 2, 3, and 4 are perspective views showing some of the different forms of sealing sleeves which may be used; and Fig. 5 is a detail view showing a modification.

Referring now to the drawings, 10 represents the jar or container, and 11 the cover, which is preferably of rubber and one of which will be provided for each cell of the battery. Each cell of the battery will be provided with the usual positive and negative plates having the positive and negative terminal posts 12 which extend upwardly through the cover 11. A vent plug is usually screwed into an opening 13 in the cover, but the plug is not here shown as it forms no part of the present invention. At the upper ends of the posts are connectors 14 having sockets which receive the upper ends of the posts, one of the connectors being a cross connector which is adapted to connect together plates of opposite polarity of adjoining cells, and the other, which is shown at the left hand side of Fig. 1, being an end or terminal conductor to which a flexible conductor is adapted to be connected.

To seal the cover against leakage of electrolyte around the posts I employ sealing sleeves designated 15 in Fig. 1. These sealing sleeves have their lower ends or portions embedded in parts which in reality constitute part of the cover and extend upwardly along the posts above the cover where they are interposed between the posts and the connectors 14 associated therewith, and are lead-burned to the latter, as in my prior application, thus intimately or integrally uniting the terminal posts, connectors and sealing sleeves. This lead-burning, as fully described in my prior application, is accomplished in the following manner: The connectors have sockets which are preferably tapered in opposite directions from the center as shown particularly at the left hand side of Fig. 1, and the upper ends of the posts and the sealing sleeves have conical portions which extend into the lower tapered parts of the sockets. Then molten lead is poured into the upper parts of the sockets, filling the latter and causing the three parts to be fused or integrally united. At the left hand end of Fig. 1 the parts are shown just before this lead burning operation, and at the right hand end of Fig. 1 the parts are shown after this lead burning operation.

As before stated, one of the features of the present invention resides in the manner in which the sealing sleeves are united or secured to the cover. This is accomplished in this case by embedding the lower portions of the sleeves in soft rubber inserts 16, which are seated in depressions of the cover immediately surrounding the posts and are vulcanized to the cover. This forms a cover, the main part of which is of hard rubber with the portions immediately surrounding the openings for the terminal posts of soft rubber. This cover is formed by using rubber for the main part thereof containing the usual amount of sulfur to form hard rubber during vulcanization and by placing in the depressions around the terminal post openings rubber inserts containing no sulfur. In the subsequent vulcanizing process enough sulfur will pass from the rubber forming the main part of the cover to the inserts 16 to effectively vulcanize these parts together.

In my prior application the sealing sleeves are vulcanized in the hard rubber cover, and an advantage of the present construction is that there is a certain degree of flexibility afforded by vulcanizing the sleeves in the soft rubber inserts or portions of the cover, and therefore the liability of breakage of the cover is reduced.

The lower ends of the sealing sleeves are proferably provided with flanged portions which extend into the rubber inserts. These portions may assume different shapes or forms, some of which I have illustrated in Figs. 2 to 4. The sealing sleeve of Fig. 2, designated 15$^a$, has a lower corrugated flange. The sealing sleeve of Fig. 3, designated 15$^b$, has a perforated flange through which the rubber will extend, and the sealing sleeve of Fig. 4, designated 15$^c$, has an open slotted flange, these constructions all resulting in good unions between the lead sealing sleeves and the rubber which receives them.

It is sometimes desirable that the sealing sleeve be not lead-burned to the connector and that the latter be clamped about the same, this being particularly true with respect to the terminal connectors of certain batteries. This is illustrated in Fig. 5, wherein the terminal post 12$^a$ is of cylindrical form throughout, and the sealing sleeve designated 15$^d$, has its upper sleeve-like portion likewise cylindrical, the latter engaging and being lead-burned to the post, the lower end of the sleeve being embedded in the soft rubber cover insert 16, as in the construction of Fig. 1. The terminal connector which is here designated 14$^a$, is clamped about the upper portion of the sealing sleeve, and the upper end of the latter where it is united to the post by lead-burning, is peened over the clamp. In these batteries having their two terminal or end connectors simply clamped to, the sealing sleeves and posts, the cross connectors are preferably lead burned to both the sealing sleeves and posts, as in Fig. 1.

Having described my invention, what I claim is:—

1. In a storage battery, a container having a cover, a terminal post extending through the cover, a sealing sleeve surrounding the post and having its lower end flexibly but tightly connected to the cover, and its upper portion lead-burned to the post.

2. In a storage battery, a container having a cover, a terminal post extending through the cover, a connector receiving the upper end of the post, a sealing sleeve surrounding the post, said sleeve having its lower portion flexibly but tightly connected to the cover and its upper portion interposed between the post and the connector.

3. In a storage battery, a container having a cover, a terminal post extending through the cover, a connector receiving the upper end of the post, a sealing sleeve surrounding the post, said sleeve having its lower portion flexibly but tightly connected to the cover and its upper portion interposed between the post and the connector and lead-burned to both the latter.

4. In a storage battery, a container having a cover with a yieldable insert secured thereto, a terminal post extending through the insert of the cover, and a sealing sleeve embedded in said insert and extending above the cover and secured to the post.

5. In a storage battery, a container having a hard rubber cover, a soft rubber insert vulcanized thereto, a terminal post extending through said insert, a sealing sleeve having its lower portion embedded in the insert, a connector at the upper end of the post, said sealing sleeve being lead-burned to the post or to the post and connector.

6. In a storage battery, a container having a cover, an insert vulcanized thereto, a terminal post extending through the insert, a connector engaging the upper part of the post, and a sealing sleeve molded in the insert around the post and integrally secured to the connector.

7. In a storage battery, a container having a hard rubber cover, an insert vulcanized thereto, a terminal post extending through said insert, a connector attached to the post, and a sealing sleeve having its lower portion molded in the insert around the post and having its upper portion integrally secured to the post or connector or both.

In testimony whereof, I hereunto affix my signature.

THEODORE A. WILLARD.